(12) United States Patent
DeBattista

(10) Patent No.: US 9,256,780 B1
(45) Date of Patent: Feb. 9, 2016

(54) FACILITATING DYNAMIC COMPUTATIONS FOR PERFORMING INTELLIGENT BODY SEGMENTATIONS FOR ENHANCED GESTURE RECOGNITION ON COMPUTING DEVICES

(71) Applicant: Aaron DeBattista, Surrey (GB)

(72) Inventor: Aaron DeBattista, Surrey (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/493,062

(22) Filed: Sep. 22, 2014

(51) Int. Cl.
*G06K 9/00* (2006.01)
*G06T 7/00* (2006.01)

(52) U.S. Cl.
CPC .......... *G06K 9/00355* (2013.01); *G06T 7/0081* (2013.01); *G06T 7/0087* (2013.01); *G06T 2207/10004* (2013.01); *G06T 2207/20021* (2013.01); *G06T 2207/20076* (2013.01); *G06T 2207/30196* (2013.01)

(58) Field of Classification Search
CPC ... G06T 7/0081; G06T 7/0083; G06T 7/0087; G06T 2207/20144; G06T 2207/10016; G06T 2207/10004; G06T 2207/20021; G06T 2207/20076; G06T 2207/30196
See application file for complete search history.

(56) References Cited

U.S. PATENT DOCUMENTS

| 5,559,902 A * | 9/1996 | Bose ........................ G06K 9/40 382/262 |
| 8,605,981 B2 * | 12/2013 | Rogan .................. C12Q 1/6883 382/133 |
| 9,047,529 B2 * | 6/2015 | Xue ......................... G06K 9/18 |
| 2002/0150308 A1 * | 10/2002 | Nakamura ......... G06K 9/00201 382/286 |
| 2006/0224231 A1 * | 10/2006 | Gregorich ............... A61F 2/915 623/1.16 |

\* cited by examiner

*Primary Examiner* — Amir Alavi
(74) *Attorney, Agent, or Firm* — Blakely, Sokoloff, Taylor & Zafman LLP

(57) ABSTRACT

A mechanism is described for facilitating intelligent detection of body segmentation for enhanced gesture recognition on computing devices according to one embodiment. A method of embodiments, as described herein, includes receiving an image, dividing the image into components representing regions of the image, determining orientation and a centroid relating to each component, facilitating generation of hypothesis cuts within hysteresis points, and calculating a first ratio based on an average width of the hypothesis cuts and a length of a first axis of a component. The method may further include segmenting the component at one of the hypothesis cuts to determine an intermediate cut of the component, if the first ratio is greater than a predetermined threshold. The method may further include iteratively segmenting the component to determine a final cut.

21 Claims, 13 Drawing Sheets

FACILITATING DYNAMIC COMPUTATIONS FOR PERFORMING INTELLIGENT BODY SEGMENTATIONS FOR ENHANCED GESTURE RECOGNITION ON COMPUTING DEVICES

FIELD

Embodiments described herein generally relate to computers. More particularly, embodiments relate to facilitating dynamic computations for performing intelligent body segmentations for enhanced gesture recognition on computing devices.

BACKGROUND

With increasing use of computing devices, such as mobile computing devices, detecting and evaluating human gestures is also becoming increasingly important. However, accurate gesture recognition has been problematic, such as in distinguishing the required regions of the human body when conveying a gesture. For example, conventional techniques are known for being associated with invasive techniques, brute force methods, lack of short sleeve support, and complex algorithmic implementations requiring specialized equipment, etc. Most invasive techniques are not practical as they constrain user experience. Brute force approaches are not only inefficient and computationally expensive, but also result in high latency and are inappropriate for low power realizations.

BRIEF DESCRIPTION OF THE DRAWINGS

Embodiments are illustrated by way of example, and not by way of limitation, in the figures of the accompanying drawings in which like reference numerals refer to similar elements.

FIG. 2I illustrates an iterative process for cutting a component of vertical orientation according to one embodiment.

DETAILED DESCRIPTION

Figure 1:
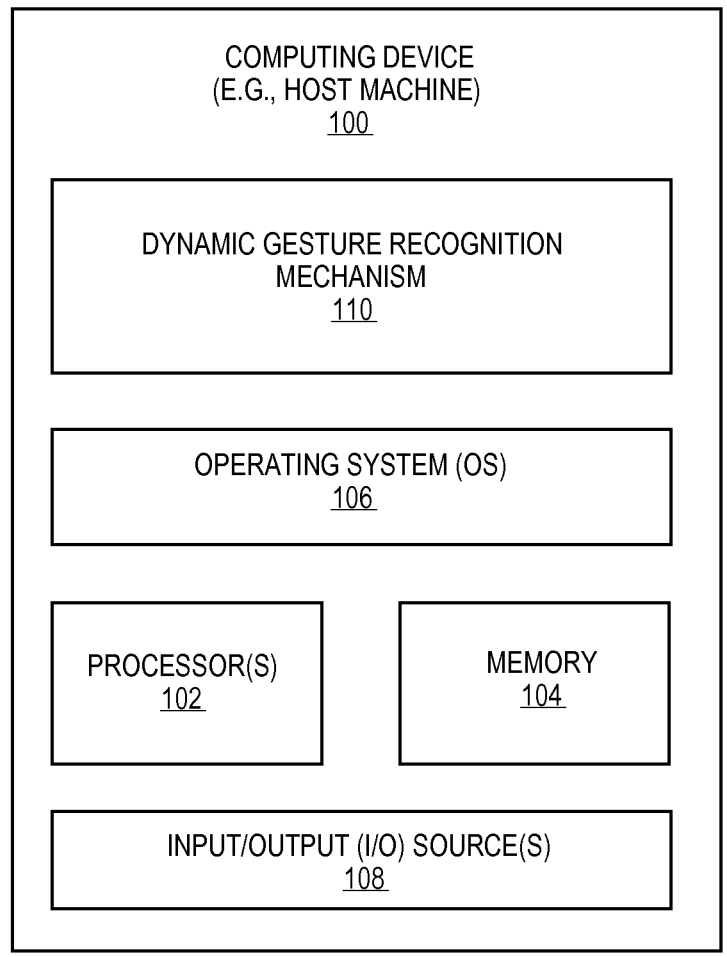
FIG. 1 illustrates a dynamic gesture recognition mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for facilitating dynamic vision computations for intelligently detecting body segmentations on computing devices. For example and in one embodiment, segmentation of certain parts of a human body, such as hand and forearm, may be calculated and evaluated. It is to be contemplated that embodiments are not limited to merely the hand and forearm of a human body and that they may be applied to any number and type of human as well as animal body parts; however, for the sake of brevity, clarity, and ease of understanding, the human hand-forearm combination is used as an example and described accordingly throughout the document.

In one embodiment, the hand and forearm may be segmented by performing cuts along the major axis of the forearm-wrist-hand region after the angle and the orientation of the region have been calculated. In one embodiment, the angle-related information may be obtained by performing, for example, principle component analysis ("PCA"), image moment analysis ("IMA"), etc. Further, regarding orientation, certain intelligent assumptions may be considered, such as a hand normally points upwards which may be regarded as a valid assumption for a great majority of human gesture applications with a few exceptions, such as horizontal hand poses which may be handled differently than vertical hand poses. In one embodiment, a Gesture Recognition Pipeline ("GRP" or simply "pipeline") may be facilitated to perform various tasks, such as the front of the pipeline may be used to detect various regions belonging to the human body using various techniques, such as (without limitation) skin extraction, shape analysis, range imagery, and machine vision, etc.

In one embodiment, detecting and segmenting the hand region from the forearm region may be performed using a proposed algorithmic technique which may allow subsequent modules in the pipeline detecting gestures to operate exclusively on the hand region. For example, in one embodiment, a separating line between the hand and the forearm may be determined, where the separating line may be regarded as the wrist. Subsequently, analysis may be performed in an iterative manner along the principal axis of the hand-forearm object component to search for an intelligent and final cut separating the hand from the forearm.

Embodiments, as further described herein, may provide for receiving an image, determining various components and their respective orientation and centroids, and locating extreme points and hypothesis points followed by calculating a first ratio based on the average of the widths of the calculated hypothesis cuts. Embodiments may further provide for iteratively segmenting the component by selecting one of the hypothesis cuts calculated at each iteration; proceeding to determining an intermediate cut of the component, if the first ratio is larger than a predetermined threshold. The above process is repeated until the first ratio falls below the predetermined threshold. The final cut if valid is finalized, using temporal filtering, where the final cut represents a desired portion of the component.

It is contemplated that with regard to several software applications, such as a computer vision application ("CVA") when targeting human computer interaction ("HCI"), it may be desirable to segment the region belonging to the hand and the forearm into two separate regions corresponding to the hand and the forearm, respectively. Accordingly presented embodiments provide covering certain parts of a hand GRP by specifically targeting detection of the hand region which may then be used to classify static gestures, such as open palm, closed palm, etc., and provide a frontend for detecting temporal gestures, such as swipe left, swipe right, etc.

In one embodiment, a robust hand pose detection technique may be enabled in the presence of short sleeves, rolled up sleeves, etc. For example, in some embodiments, an assumption is made that a skin filtering algorithm operating on each frame of a video stream may first extract skin pixels forming a skin image. Then, in one embodiment, a skin image may be considered for segmenting potential hand regions from potential forearm-regions which enables a robust hand pose matching even in the presence of short or rolled-up sleeves.

This technique increases the probability of gesture classifiers correctly classifying and tracking specific gestures. Further, for example, if skin information is used, then embodiments may provide for segmenting the hand region from larger skin components and performing additional processing of hand pose matching.

It is contemplated that embodiments may be applied to other input streams, such as depth maps obtained from three dimensional ("3D") cameras where the forearm and the hand may be detected as one object and in the same depth plane, necessitating the aforementioned segmentation.

FIG. 1 illustrates a dynamic gesture recognition mechanism 110 according to one embodiment. Computing device 100 serves as a host machine for hosting dynamic gesture recognition mechanism ("gesture mechanism") 110 that includes any number and type of components, as illustrated in FIG. 2, to efficiently perform intelligent detection and computation of segmentation of body regions for improved gesture recognition as will be further described throughout this document.

Computing device 100 may include any number and type of communication devices, such as large computing systems, server computers, desktop computers, etc., and may further include set-top boxes (e.g., Internet-based cable television set-top boxes, etc.), global positioning system ("GPS")-based devices, etc. Computing device 100 may include mobile computing devices serving as communication devices, such as cellular phones including smartphones, personal digital assistants ("PDAs"), tablet computers, laptop computers, e-readers, media internet devices ("MIDs"), smart televisions, television platforms, wearable devices, (glasses, watch, bracelet, smartcard, jewelry, clothing items, etc.), intelligent devices, computing dust, and media players, etc.

Computing device 100 may include an operating system ("OS") 106 serving as an interface between hardware and/or physical resources of the computer device 100 and a user. Computing device 100 further includes one or more processors 102, memory devices 104, network devices, drivers, or the like, as well as input/output ("I/O") sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

Figure 2A:
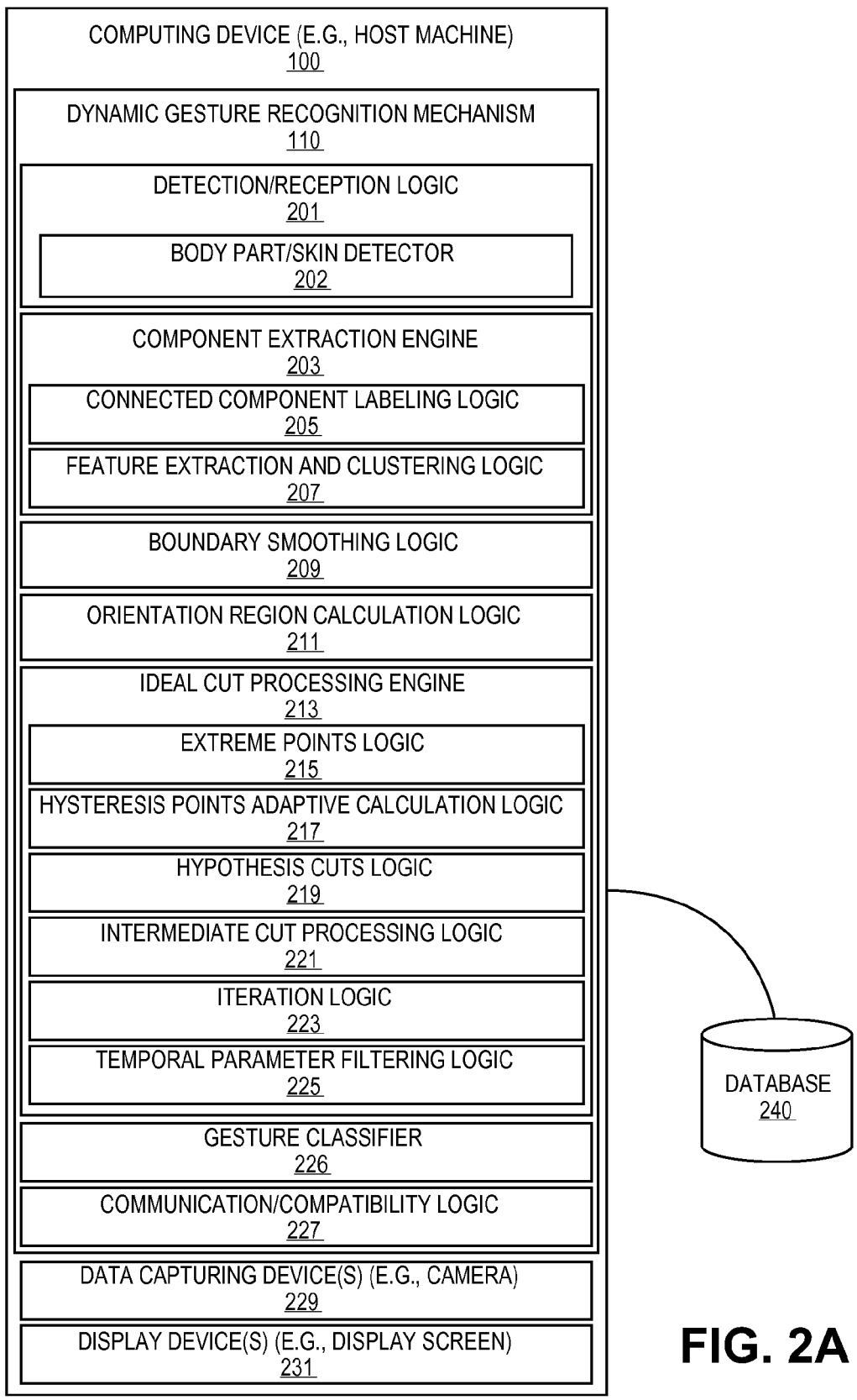
FIG. 2A illustrates a dynamic gesture recognition mechanism according to one embodiment.

FIG. 2A illustrates a dynamic gesture recognition mechanism 110 according to one embodiment. In one embodiment, computing device 100 may serve as a host machine for hosting gesture mechanism 110 that includes any number and type of components, such as: detection/reception logic 201 including body part/skin detector 202; component extraction engine ("extraction engine") 203 including connected component labeling logic ("labeling logic") 205 and feature extraction and clustering logic ("extraction/clustering logic") 207; boundary smoothing logic ("smoothing logic") 209; orientation region calculation logic ("region logic") 211; ideal cut processing engine ("processing engine") 213 including extreme points calculation logic ("extreme points logic") 215, hysteresis points adaptive calculation logic ("hysteresis logic") 217, hypothesis cuts logic 219, intermediate cut processing logic ("cut logic") 221, iteration logic 223, and temporal parameter filtering logic ("filtering logic") 225; gesture classifier 226; and communication/compatibility logic 227.

Computing device 100 may be in communication with one or more database, such as database 240, where any amount and type of system parameters along with any amount and type of other information and data sources, such as resources, policies, etc., may be stored. Further, computing device 100 may be in communication with any number and type of other computing devices, such as a desktop computer, laptop computer, mobile computing device, such as a smartphone, tablet computer, etc., over one or more networks, such as cloud network, Cloud of Things ("CoT"), Internet of Things ("IoT"), the Internet, intranet, proximity network, Bluetooth, etc.

In the illustrated embodiment, computing device 100 is shown as hosting gesture mechanism 110; however, it is contemplated that embodiments are not limited as such and that in another embodiment, gesture mechanism 110 may be entirely or partially hosted by multiple devices, such as both server and client computing devices. However, throughout this document, for the sake of brevity, clarity, and ease of understanding, gesture mechanism 110 is shown as being hosted by computing device 100.

It is contemplated that computing device 100 may include one or more software applications (e.g., website, business application, mobile device application, etc.) in communication with gesture mechanism 110, where a software application may offer one or more user interfaces (e.g., web user interface (WUI), graphical user interface (GUI), touchscreen, etc.) to work with and/or facilitate one or more operations or functionalities of gesture mechanism 110. Similarly and for example, computing device 100 may include one or more data capturing device(s) 229 (e.g., camera, microphone, etc.) that may be used for capturing any amount and type of data, such as images (e.g., photos, videos, etc.), audio streams, biometric readings, environmental/weather conditions, maps, etc., where one or more of data capturing devices 229, such as a camera, may be in communication with one or more components of gesture mechanism 110, such as reception/detection logic 201, to detect and receive images captured by the camera. Computing device 100 may further include one or more display device(s) 231 (e.g., display screen, display device, etc.) and be in communication with communication/compatibility logic 227 to facilitate displaying of images, etc.

In some embodiments, data capturing device(s) 229 may include (without limitation) audio/visual devices (e.g., cameras, microphones, speakers, etc.), context-aware sensors (such as temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device, etc.), global positioning system ("GPS") sensors, resource requestor, and trusted execution environment ("TEE") logic. TEE logic may be employed separately or be part of resource requestor and/or an I/O subsystem, etc.

Figure 2B:
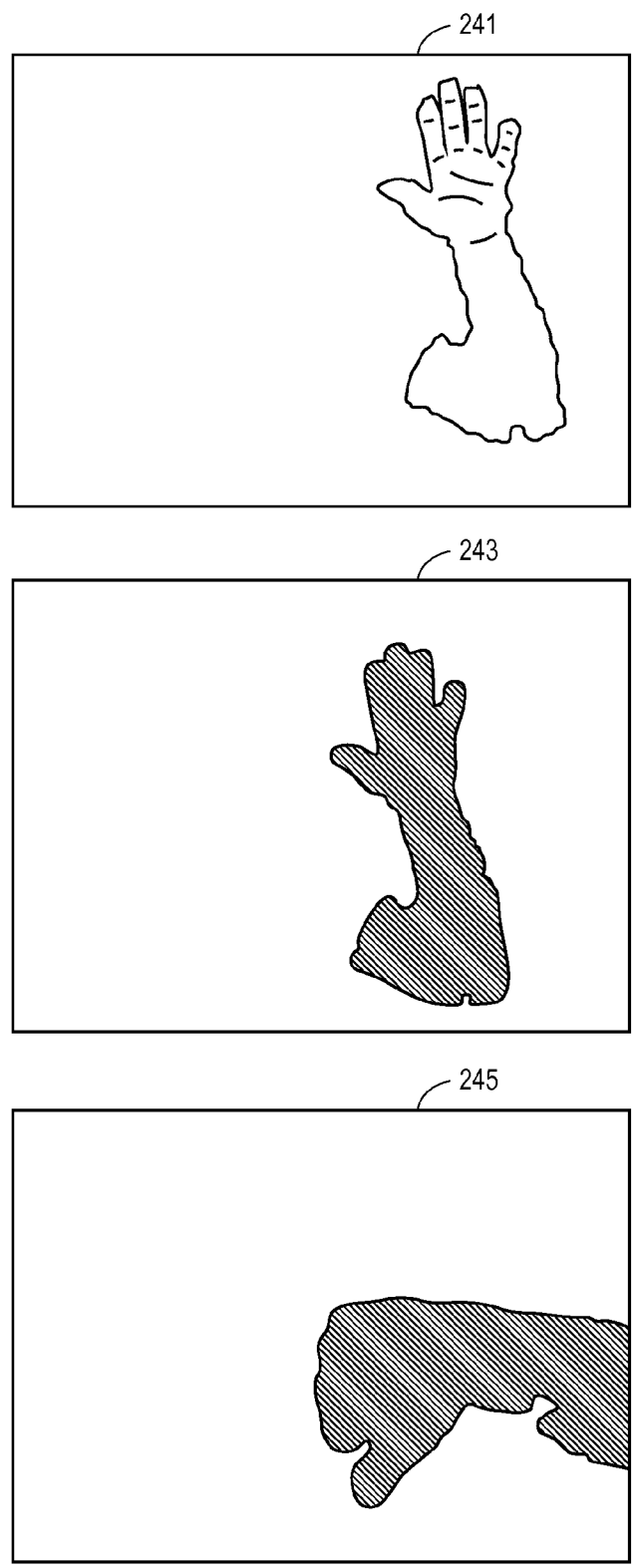
FIG. 2B illustrates input images according to one embodiment.

Referring back to and using the hand-forearm region as an example, in one embodiment, an image may be captured, via data capturing device 229 (e.g., camera), which is then communicated to detection/reception logic 201 where the individual image is detected and accepted as an input. In one embodiment, detection/reception logic 201 may include body part/skin detector 202 to detect parts belonging to the human body as obtained from an image received at detection/reception logic 201. For example and in one embodiment, the image may be produced by a skin tone filtering algorithm assigning a value (e.g., Y value) to skin pixels and a value (e.g., 0) to non-skin pixels where Y represents a grayscale luma value. Referring to FIG. 2B, it illustrates a set of images, such as input skin grayscale image 241, input binary image 243, and finally, another input binary image 245 that is horizontal in nature as opposed to being vertical like images 241 and 243.

It is contemplated that various embodiments may facilitate using different methods to extract individual components associated with different regions (e.g., head, hand, etc.) of the human body as detected from the captured images and facilitated by body part/skin detector 202. For example, in one embodiment, this extraction may be performed based on a connected component labelling algorithm, as facilitated by labeling logic 205, and, in another embodiment, based on feature clustering as facilitated by extraction/clustering logic 207, and so forth, where the output of both embodiments, as facilitated by the aforementioned components 205, 207, may be the same. These outputs may be a series of binary images, where each binary image contains a single component as shown with reference to images 243, 245 of FIG. 2B, respectively. Further, an output may also include metadata regarding a particular component, such as centroid, orientation, etc. In some embodiments, smaller component or areas smaller than a given threshold may be discarded as noise. It is to be noted that terms "component" and "object" may be used interchangeably throughout this document.

In one embodiment, labeling logic 205 of extraction engine 203 may be triggered to being by regarding the input grayscale image (such as image 241 of FIG. 2B) as an initial binary image (such as image 243 of FIG. 2B) obtained through a thresholding and morphological filtering process. Then, the image is assumed to be composed of a series of components which are labelled as compact entities as facilitated by labeling logic 205. Further, for each component, its centroid and orientation are calculated. The output series of binary images is then constructed by retaining a single connected component in each output image.

In another embodiment, extraction/clustering logic 207 may be triggered to use extracted features for clustering as opposed to using the connected component labeling of labeling logic 205. For example, features (e.g., blob features) are extracted from the input image and used for subsequent processing. In one embodiment, using extraction/clustering logic 207, extracted features may be clustered using one or more clustering techniques, such as hierarchical clustering, iterative clustering, etc., as facilitated by extraction/clustering logic 207. These clusters of features may then be used for calculation of an angle and orientation of each individual region using one or more techniques, such as principal component analysis, etc., as facilitated by extraction/clustering logic 207. The output series of binary images may then be constructed by associating the clusters with the original objects and retaining a single component in each output image, applying a thresholding process to obtain the binary output.

Further, morphological operations may be applied to the output binary images in order to fill in any small missing regions that may distort the object shape. Each individual binary output image containing a single component is then processed individually.

In one embodiment, the component boundary may be extracted using one or more tracing algorithms, such as square-tracing, Moore neighbor, radial sweep, etc., as facilitated by smoothing logic 209. This tracing may start from an arbitrary point on the object's contour and trace around the object converting the sequential coordinates into a linear array (x, y) of tuples. Once the tracing is accomplished, a smoothing function may be initiated by smoothing logic 209, such as by independently applying a low pass filter response to the x and y sequences. The coordinate values may be considered circular when handling boundary filtering positions. The smoothing process removes any edge irregularities, where such edge irregularities are known or likely to affect the calculation of the width of each hypothesis cut under consideration within a calculated hysteresis region as will be further described with reference to processing engine 213. In one example, once this smoothing is completed, the smoothed/filtered coordinates are laid onto the image again and a flood fill algorithm may be applied to re-build the dense component.

Upon completion of boundary smoothing, in one embodiment, region logic 211 may be triggered and begin performing its tasks and functionalities with one or more assumptions, such as regarding the hand-forearm angle to lie within the upper half of a full 360 degree space which may mean that the user may not perform gestures pointing downwards. In further embodiments, depending on operating conditions and complexity requirements one may support a full 360 degree space by implementing multiple searches at the top and bottom of the hand and forearm region and allowing the gesture classifier 226 to prune invalid gestures. For the sake of brevity, clarity, and ease of understanding, throughout this document, the hand fore-arm angle is assumed to lie in the upper half of the 360 degree space.

Figure 2C:
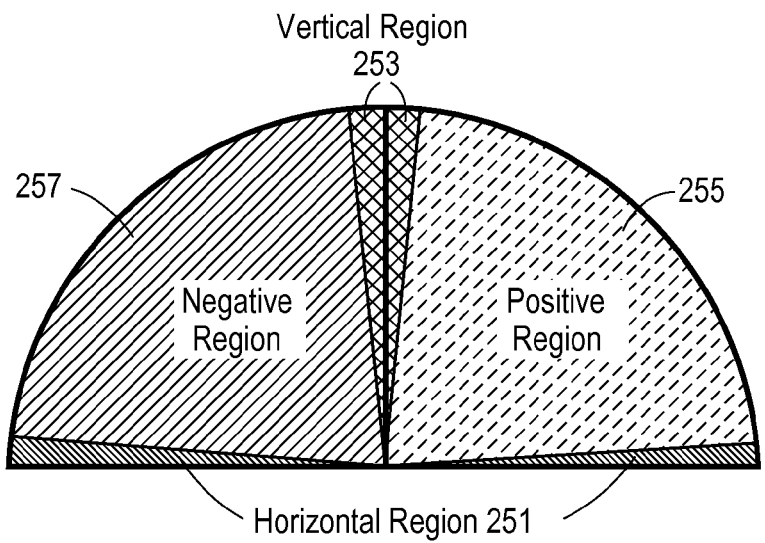
FIG. 2C illustrates angular operating regions relating to a component according to one embodiment.

For each dense component produced by a previous stage, an angular value (orientation) may be calculated as facilitated by extraction engine 203. Further, as illustrated with respect to FIG. 2C, an angle of the major vertical axis may be calculated and normalized within a particular range, such as from 0 to 180, starting from a west horizontal position (e.g., 0 degrees) all the way to an east horizontal position (e.g., 180 degrees) as facilitated by orientation region logic 211. Once the angle is calculated, the component may be labelled as belonging to a number of distinct orientation regions these being, horizontal, negative, positive, and vertical regions, as illustrated in FIG. 2C and facilitated by region logic 211. The horizontal and vertical regions can be considered as special regions having an angular value of, for example, 5 or 10 degrees.

Moreover, as illustrated in FIG. 2C and facilitated by region logic 211, in those regions labelled as positive 255 and negative 257, the angle of the major vertical component is well-defined and can be determined irrespective of the component distribution. This may not be as clearly defined with respect to the vertical region 253 and horizontal regions 251 and accordingly, these regions may be considered special regions along with necessitating various assumptions or further processing.

For example, horizontal region 251 of FIG. 2C may concern or include horizontal or almost horizontal components where the calculated angle may be ambiguous due to the shape of the object. It is to be noted that with respect to calculations made by extraction engine 203, although the calculated angle may be negative; it may result that the component probably be assigned a positive angle. The erroneous result may be due to the distribution and/or shape of the component, such as the elevated position of the elbow. This leads to the query whether the hand region whiten the component be searched in the left end or the right end of the horizontal component. Similarly, for example, vertical region 253 of FIG. 2C may concern or include vertical or almost vertical components and again, in this region, the angle may again be ambiguous due to the distribution and/or shape of the object. Accordingly, vertical and horizontal regions 251, 253 may be regarded as ambiguous regions (as compared to positive and negative regions 255, 257), where the objects/components assigned to these regions may be considered for different processes by iterative cut processing engine 213 and gesture mechanism 110.

For example, for vertical region 253, the component angle may be fixed to 90 degrees, regardless of the calculated angular value, where for horizontal region 251, a hand region segment may be searched both at the left end and the right end of the original component to allow the actual pose matching process to prune out the wrong side as facilitated by gesture classifier 226. Further, assuming the hand region of the hand-forearm region is located upwards of the centroid within negative 257, positive 255 and vertical region 253 is unambiguous assuming that the user is not inverting their hand upside down in which case this may lead to an invalid gesture shape which may then be successfully rejected by a gesture classifier, such as gesture classifier 226.

Following the angle/orientation calculation facilitated by extraction engine 203 and orientation region calculation logic 211, respectively, in one embodiment, iterative processing of the component may begin to determine the wrist position within the hand-forearm region as described below and facilitated by processing engine 213.

Figure 2D:
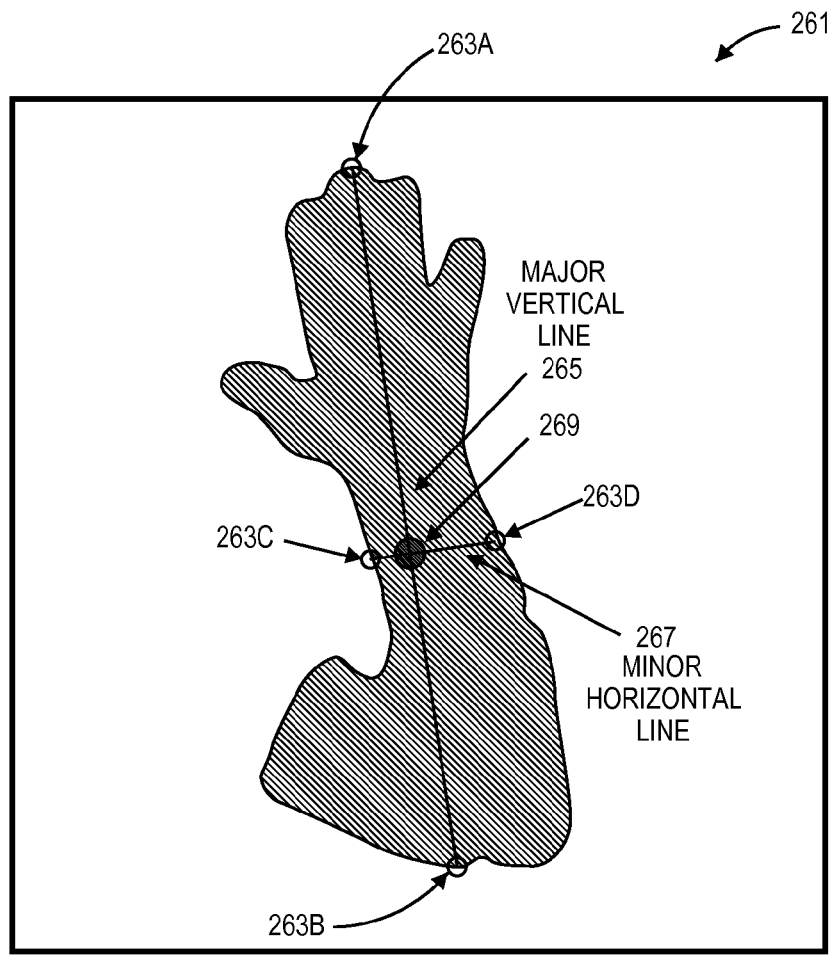
FIG. 2D illustrates extreme points on a binary component within an image according to one embodiment.

Referring to FIG. 2D, it illustrates binary image 261 which is obtained from the original input image, such as input image 241 of FIG. 2B, after it has been subject among other processes to the aforementioned contour smoothing and orientation calculation processes. In one embodiment, upon going through the contour smoothing and orientation calculation processing, outlined image 261 of FIG. 2D is obtained and then put through another set of processes as facilitated by processing engine 213. For example and in one embodiment, extreme points logic 215 is triggered to calculate extreme points 263A, 263B, 263C, 263D on the contour of the component along the major vertical line ("major axis") 265 and minor horizontal line ("minor axis") 267, where the intersection point of major axis 265 and minor axis 267 may be referred to as centroid 269. As illustrated with respect to FIG. 2D, horizontal line/axis representing minor axis 267 is shown and presumed to be orthogonal to the vertical line/axis representing major axis 265. It is contemplated that major and minor lines/axis may change in accordance with the position of the component, such as in the case of a horizontal input component, such as input image 245 of FIG. 2B, were the vertical axis may be regarded as the minor axis and where the horizontal axis may be regarded as a major axis. It is to be noted that terms "line" and "axis" may be used interchangeably.

In one embodiment, using extreme points logic 215, a search may be performed along the axis starting from a pre-computed centroid, such as centroid 269, of the component illustrated in image 261. Continuing the process, once an initial extreme point of the illustrated extreme points 263A, 263B, 263C, 263D is calculated, an elongated jump across or along the axis is performed in order to confirm the true outer edges of the component were reached while avoiding any probability of getting stuck against any inward ridges or holes (in the shape of the component) during the calculation of extreme points 263A, 263B, 263C, 263D.

Figure 2E:
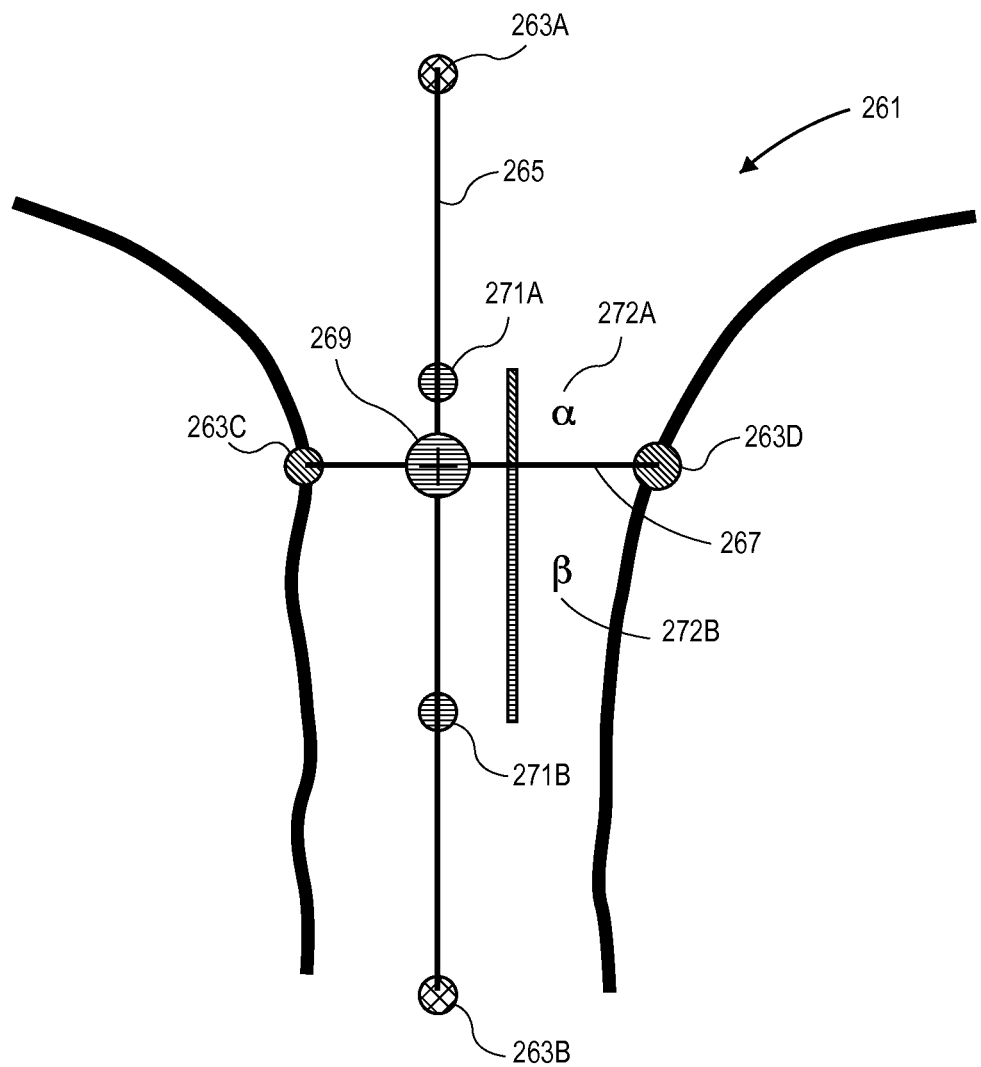
FIG. 2E illustrates hysteresis points on a binary component within an image according to one embodiment.

Once we have calculated extreme points 263A, 263B, 263C, 263D, hysteresis logic 217 may be triggered to calculate hysteresis points, such as vertical hysteresis points 271A, 271B along major vertical axis 265 as illustrated with respect to FIG. 2E which may be used to determine the region within which the best cut for the wrist location is searched. By conducting analysis of any number of hand-forearm images of various individuals, it may be determined that in order to increase the probability of locating the right cut and decrease the probability of getting it wrong, the area around centroid 269 may not be ideal for producing uniform hysteresis points especially when considering the upper hysteresis point 271A which, if placed too high, may lead to a high probability of including wrong cuts coming from the upper hand region (as it approaches the fingers).

Figure 2F:
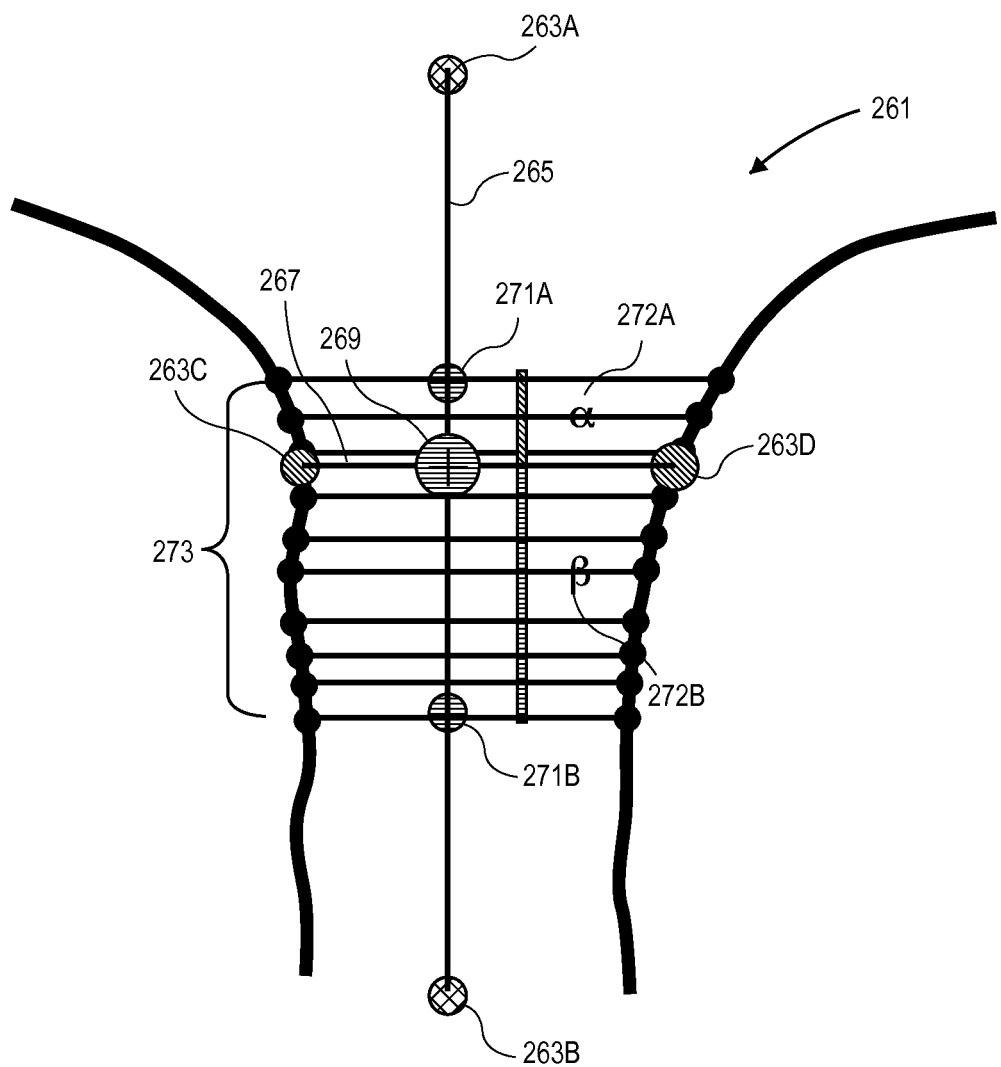
FIG. 2F illustrates hypothesis cuts on a binary component within an image according to one embodiment.
Figure 2G:
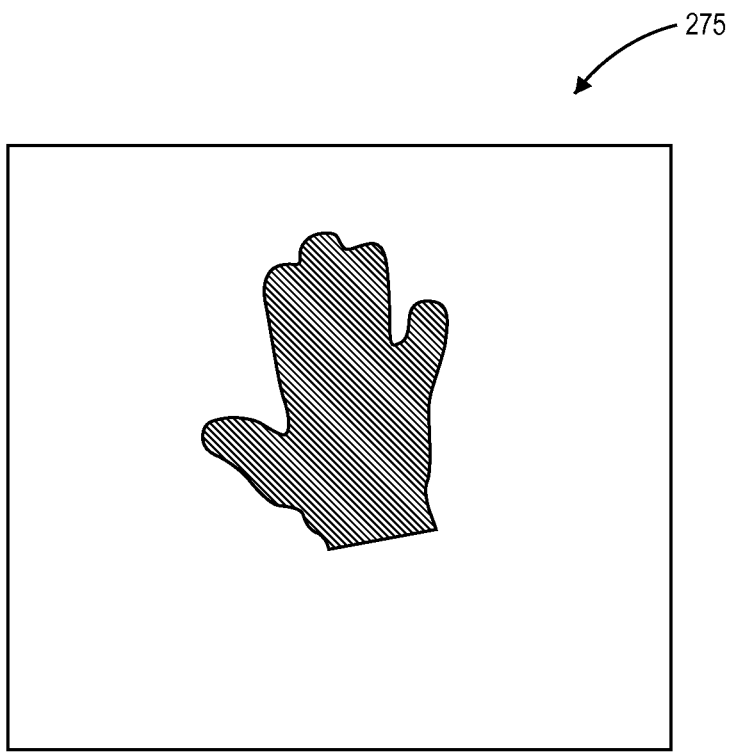
FIG. 2G illustrates a final cut of a component according to one embodiment.
Figure 2H:
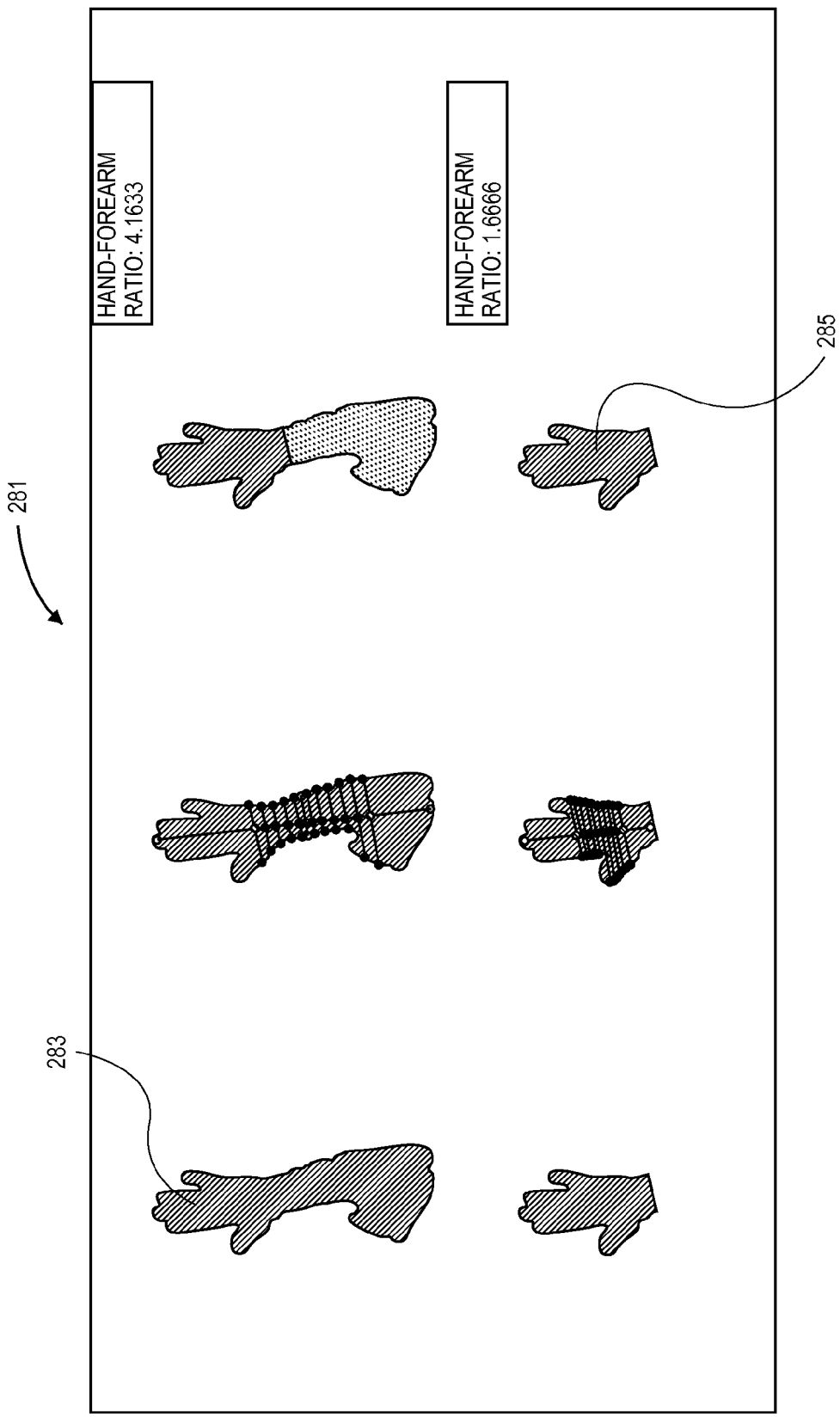
FIG. 2H illustrates an iterative process for cutting a component of vertical orientation according to one embodiment.
Figure 21:
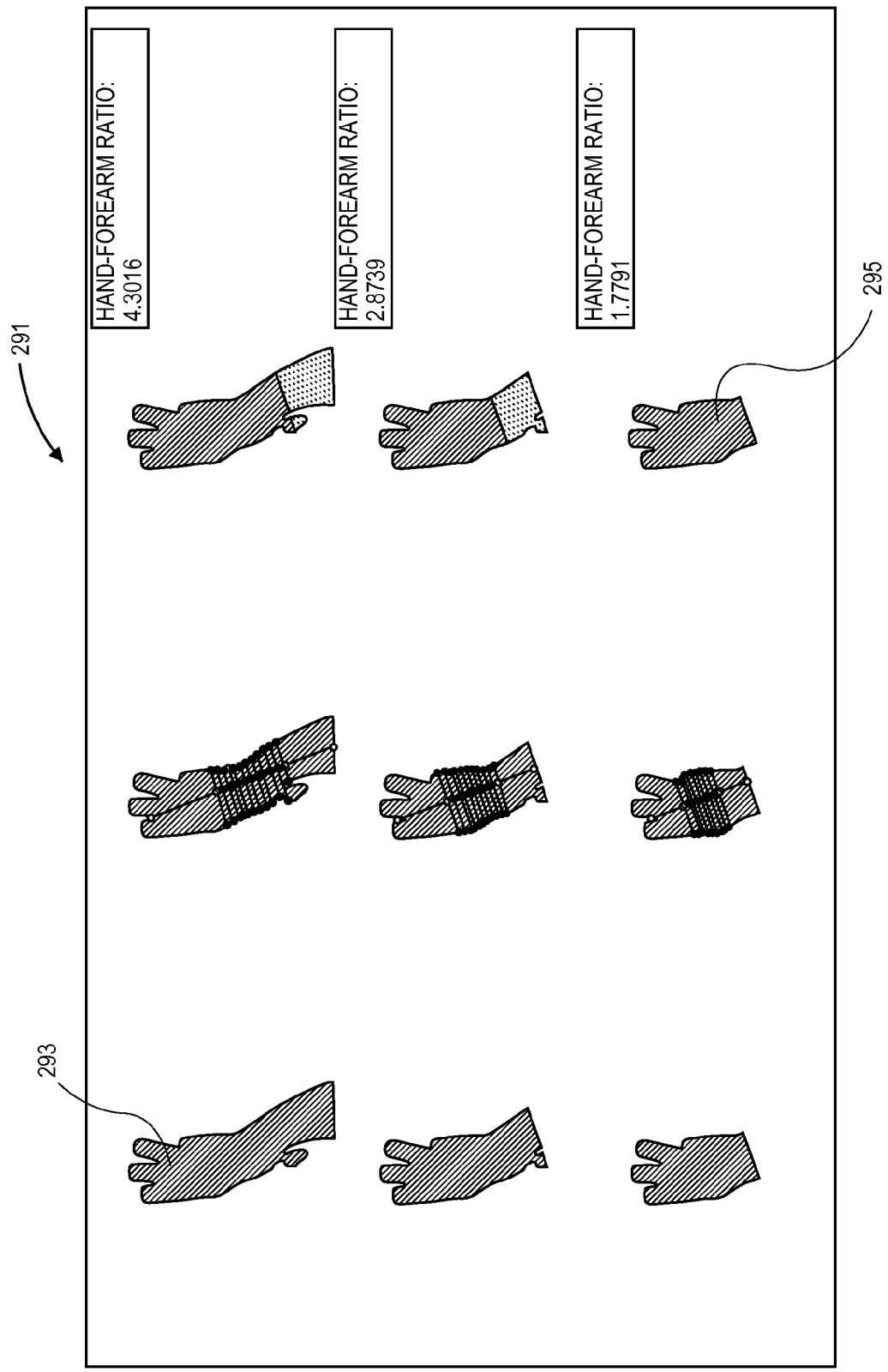
Figure 2J:
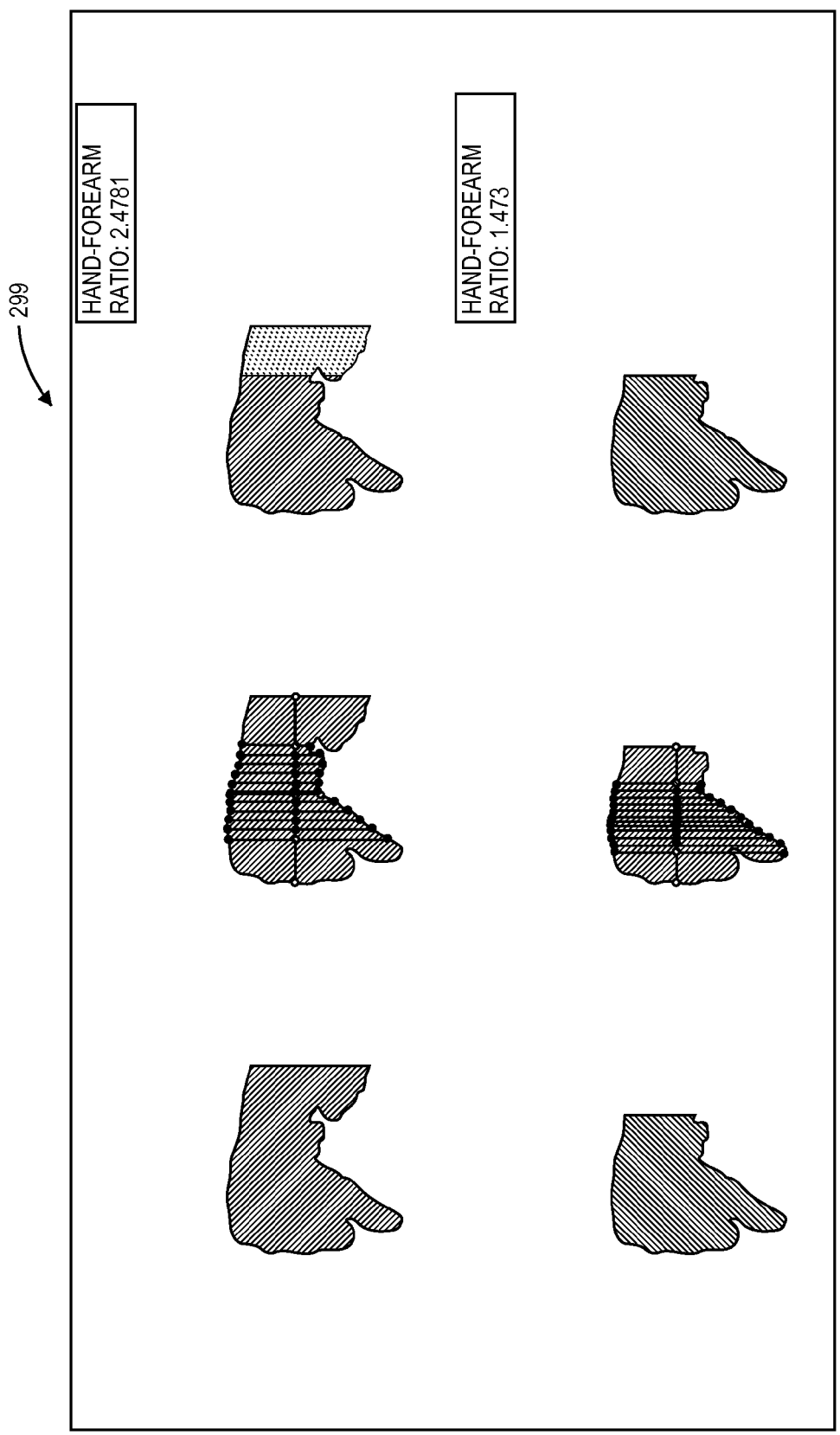
FIG. 2J illustrates an iterative process for cutting a component of horizontal orientation according to one embodiment.
Figure 2K:
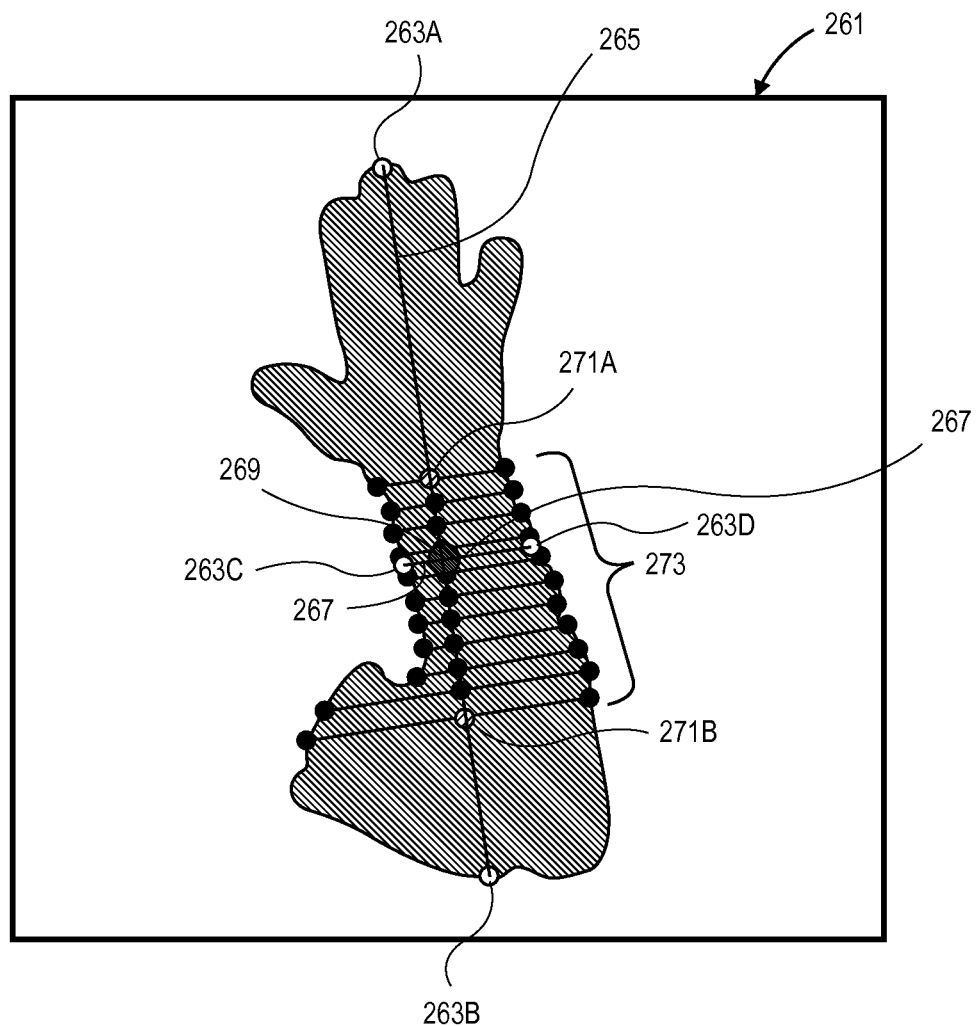
FIG. 2K illustrates hypothesis cuts on a binary component within an image according to one embodiment.

For example, as illustrated in FIG. 2K, upper hysteresis point 271A and lower hysteresis point 271B may be initially placed along the major axis based on a first value (referred to as alpha ("α") 272A) (e.g., α=0.2) and a second value (referred to as beta ("β") 272B) (e.g., β=0.5), respectively. These values determine the proportion of the distance between the major axis extreme point 263A and 263B and centroid 269 at which the hysteresis points 271A and 271B are placed. Stated differently, if the distance between point 263A and centroid 269 is defined as I, then hysteresis point 271A is placed at a distance α*I from centroid 269 along the major axis and in the direction of 263A. The process of placing hysteresis point 271B follows the same logic for hysteresis point 271A.

It is contemplated that any terms and values (e.g., such alpha being 0.2, beta being 0.5, angular value for the horizontal and vertical region being set to 5, etc.) are merely recited here as examples for brevity and ease of understanding and that embodiments are not limited to any particular type or amount of terms or values and that any type and amount of terms and values may be employed and used with one or more embodiments.

Once the initial values of hysteresis points 271A-B are known or set, hysteresis logic 217 modifies these values by adding increments (or subtracting decrements) depending on the ratio between major axis 265 and minor axis 267 as determined from the formula as set forth below:

$$\text{Axis Ratio} = \text{Length of Major Axis} / \text{Length of Minor Axis}$$

Further, the aforementioned increments or decrements may be controlled by a series of predefined inequalities proportional to the axis ratio. These increments/decrements modification may be applied to adjust against the determined size of the axis ratio, such as a high axis ratio which indicates a long forearm in which case the location of upper hysteresis point 271A and the location of lower hysteresis point 271B in image 261 are increased proportionally. On the other hand a low axis ratio results in the location of the upper and lower hysteresis points being decreased. It is contemplated that decreasing may refer to placing hysteresis points 271A, 271B closer to centroid 269 of the component, where increasing may refer to placing hysteresis points 271A, 271B further away from centroid 269. This exact modification process may include performing a number of if-then-else checks to check whether the axis ratio is inside a predefined implementation-dependent intervals where each interval is associated with a series of heuristic constants (e.g., increments and/or decrements). Such constants (e.g., increments or decrements) may be retrieved and used for modifying the locations of hysteresis points 271A, 271B.

Upon determining the location of the hysteresis points through the adaptive process just described, in one embodiment, hypothesis cuts may be performed as facilitated by hypothesis cut logic 219. As illustrated with respect to FIG. 2F, for example and in one embodiment, a series of hypothesis cuts 273 may be generated within the region between hysteresis points 271A and 271B. As shown in FIG. 2F, hypothesis cuts 273 may be parallel to minor horizontal axis 267 and are equally spaced starting from upper hysteresis point 271A and continuing down and ending at lower hysteresis point 271B. Further, using hypothesis cut logic 219, the width of each of hypothesis cut 273 may be calculated, where the width refers to the distance between horizontal extreme points 263C, 263D as illustrated with respect to hypothesis cuts 273.

In one embodiment, a hand-forearm ratio may be calculated using the following formula:

Hand ForeArm Ratio(H.F.A)=Length of Major Axis/ Average of Hypothesis Cuts Lengths A predefined threshold T is set which is used to determine whether a selected ideal intermediate cut may be applied or not. If the hand-forearm ratio is larger than T, the cut may be applied; otherwise, the cut is not applied. This will be further described with reference to the iterative process which is facilitated by iteration logic 223. Further, it may be contemplated that the aforementioned Hand ForeArm Ratio equation may take various embodiments including, for example, being based on different metrics derived from the hypothesis cuts.

Now briefly referring to FIG. 2K, it illustrates another embodiment similar to FIGS. 2E-2F, where FIG. 2K further illustrates hysteresis points 271A, 271B, hypothesis cuts 273, extreme points 263A-D, centroid 269, α 272A, β 272B, major vertical axis 265, minor horizontal axis 267, etc.

Once the ideal immediate cut is derived, intermediate cut logic 221 is triggered to select and apply the cut given the hand-forearm ratio is larger than T. In some embodiments, an ideal intermediate cut may be a hypothesis cut that is the smallest in length/width. Upon applying the cut, centroid 269 of the new modified component is re-calculated along the major axis. In some embodiments, iterative processing may be triggered as will be further described below, but, in some other embodiments, where iterative processing is switched off then the intermediate cut at this iteration is effectively regarded as the final intermediate cut. It is to be noted that the cut is only applied if the hand-forearm ratio is greater than T and this also applies in the case were iterative processing is switched off. If the hand-forearm ratio is lower than T on the first iteration and iterative mode is off then no intermediate cuts are applied to the component. Also if, the hand-forearm ratio is lower than T on the first iteration and the iterative mode is on, then again no cuts are applied to the component.

In some embodiments, iterative processing may be applied to the input component such that a final intermediate cut may be obtained through iteration. For example, FIGS. 2H, 2I and 2J illustrate three different iterative processes 281, 291, 299 that are shown to work on different images, forms and/or positions. Iterative processing 281, 291 relate to vertical hand-forearm gestures and orientation, but iterative process 299 illustrates a horizontal hand-forearm gesture. For example, iterative process 281 of FIG. 2H includes two iteration cycles (each iteration illustrated by a row of images) illustrated by the six images, staring with first image 283 and ending with final image 285 (also shown in FIG. 2G) which segments or distinguishes the hand from the forearm.

In one embodiment, after the first run is completed and the intermediate cut is applied, the process of re-computing the hand-forearm ratio may be redone centered around and relating to the recalculated centroid using, in one embodiment, the same initial orientation. Accordingly, in one embodiment, when each time an iterative process is triggered, one or more of the processes performed by extreme points logic 215, hysteresis points adaptive logic 217, hypothesis cuts logic 219, and intermediate cut logic 221 are performed and repeated until the final intermediate cut is obtained as illustrated in image 275. Subsequently, if the hand-forearm ratio lies below or is equal to the predefined threshold, T, then the iterative process may end without performing any more cuts. However, if the ratio is above T, then further cuts may be performed and this iterative process may continue until the hand-forearm ratio falls below T.

For example, using iteration process 291 of FIG. 2I, the value of T may, for example and without limitation, be set to 2.3. Further, in first iteration 293 ($1^{st}$ Row of image 291) of the iterative process, the hand-forearm ratio was calculated to be 4.3016 and accordingly, a cut is performed. Further, in second iteration ($2^{nd}$ Row of image 291) of the iterative process, the hand-forearm ratio is calculated to be 2.8739 and thus another cut is performed. Subsequently, in the third iteration ($3^{rd}$ Row of image 291) of the iterative process, the hand-forearm ratio is calculated to be 1.7791, which is below T, and thus the cut is not needed and the iterative processing is concluded. It is contemplated that in some embodiments, other details of the iterative process especially the decision of whether to iterate and the location where this decision (as facilitated by iteration logic 223) is taken may differ depending on performance and operational requirements.

It is contemplated that in some embodiments, other details of the iterative process may differ when the original component angle lies in a particular region, such as horizontal region 251 of FIG. 2C. For example, in a region like the aforementioned horizontal region, both hysteresis points values (α & β) may be initially set to, for example, an initial value (e.g., 0.5, etc.). Further, hypothesis cuts are iteratively constructed (if iteration mode is on) and applied on segments located on both ends of the original component, where the hand is searched not only in one direction (e.g., left direction), but also in the other direction (e.g., right direction). This approach is taken because the original component is horizontal and it may not be known, in advance, on which side the hand lies.

It is further contemplated that the iterative processing is due to (without limitations): (1) errors in the shape composition of the hand and forearm regions as shown in iteration process 291 of FIG. 2I, where, for example, the peninsula region along the forearm may generate a thin region within the forearm which may lead to a cut which may be too far away from the actual wrist position; and (2) gesture mechanism 110 may be based on some pre-defined heuristics, assumptions, and constant values, such as T. While these are solidly built on observations and training across a large set of varied images and video sequences, an iterative process may alleviate any imperfections in predefined values. It is also contemplated that T can be made adaptive on observed measurements, operating conditions and other system parameters.

If gesture mechanism 110 is run on a video stream, there may be a temporal aspect to it that may be exploited in refining the final cut position from one frame to the next as facilitated by filtering logic 225. For example, using filtering logic 225, a prediction filter, such as a Kalman Filter, may be applied onto the final intermediate cut position across frames to avoid the effect of noisy predictions leading to jitter in the final cut position transitioning from one frame to another. In one embodiment, where on the first iteration, the H.F.A ratio is found to be already below T then, this observation may be fed directly to the temporal filter, such as filtering logic 225, which, using any previous observations, may decide whether to apply a predicted final cut or not. Further, based on such previous observations, the prediction filter may conclude that no cut is required at the current observation (as may have been observed) or a valid cut may be predicted from the current and previous observations.

In one embodiment, images may be captured via capturing components 229, processed via gesture mechanism 110, and the respective detected gestures used by subsequent applications or results displayed via display components 231. It is contemplated that gesture mechanism 110 may be used with and in communication with one or more software applications, such as one or more email applications, text or phone using one or more telecommunication applications, social/business networking websites, or the like, gaming applications and human devices interaction especially for controlling various applications. Various devices can be employed including (e.g. personal computers, mobile phones, wearable devices, etc.).

Communication/compatibility logic 227 may be used to facilitate dynamic communication and compatibility between computing device 100 and any number and type of other computing devices (such as mobile computing device, desktop computer, server computing device, etc.), processing devices (such as central processing unit (CPU), graphics processing unit (GPU), etc.), data capturing devices 229 (such as camera, microphone, biometric sensor, etc.), display devices 231 (such as a display device, display screen, etc.), user/context-awareness components and/or identification/verification sensors/devices (such as biometric sensor/detector, scanner, etc.), memory or storage devices, databases and/or data sources (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "point", "tool", and the like, may be referenced interchangeably and include, by way of example, software, hardware, and/or any combination of software and hardware, such as firmware. Further, any use of a particular brand, word, term, phrase, name, and/or acronym, such as "image", "cut", "vision technique", "gesture", "hand-forearm", "ratio", "threshold", "axis", "vertical", "horizontal", "iteration", "calculation", "extreme points", "hysteresis points", "hypothesis cuts", "text" or "textual", "photo" or "image", "video", "social networking website", "logic", "engine", "module", etc., should not be read to limit embodiments to software or devices that carry that label in products or in literature external to this document.

It is contemplated that any number and type of components may be added to and/or removed from gesture mechanism 110 to facilitate various embodiments including adding, removing, and/or enhancing certain features. For brevity, clarity, and ease of understanding of gesture mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
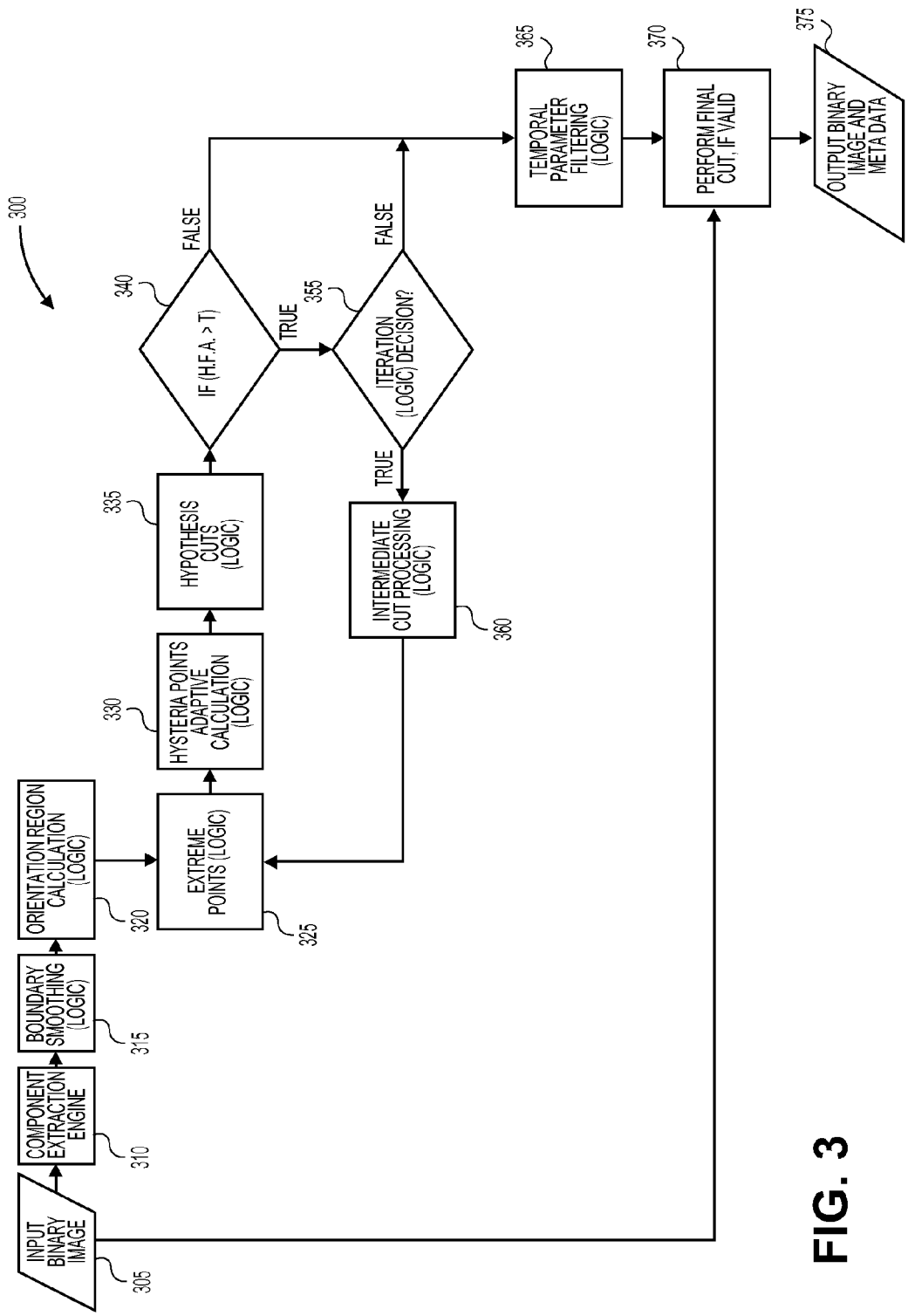
FIG. 3 illustrates a method for facilitating intelligent detection of body segmentation for enhanced gesture recognition at computing devices according to one embodiment.

FIG. 3 illustrates a method 300 for facilitating enhanced gesture recognition on computing devices using gesture mechanism 110 of FIG. 2A according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be included as part of gesture mechanism 110 of FIG. 1. The processes of method 300 are illustrated in linear sequences for brevity and clarity in presentation; however, it is contemplated that any number of them can be performed in parallel, asynchronously, or in different orders. For brevity, many of the details discussed with reference to FIGS. 1 and 2A-H may not be discussed or repeated hereafter.

Method 300 begins at block 305 with receiving an input gray scale image of, for example, multiple sections of the human body (e.g., head, hand-forearm, etc.). The image may be captured by a data capturing component, such as a camera, at a computing device and forwarded to the detection/reception Logic 201 of FIG. 2A for pre-processing. At block 310, in one embodiment, connected component labeling may be performed by, for example, extraction engine 203 and its components. At block 315, smooth boundary processing of the component may be performed by smoothing logic 209. The smoothing process may be followed by, in one embodiment, orientation region calculation of the object as facilitated by region logic 211 of gesture mechanism 110 of FIG. 2A at block 320.

In one embodiment, the processing of the image containing the component continues at block 325 with calculation of extreme points along the major axis (e.g., extreme points at various sides (e.g., top, bottom, left, and right sides) of the image) as performed by extreme points logic 215 and similarly, at block 330, adaptive hysteresis points may be calculated using hysteresis logic 217 of gesture mechanism 110 of FIG. 2A. In one embodiment, at block 335, the process may continue with assigning hypothesis cuts as facilitated by hypothesis cuts logic 219.

In one embodiment, using the aforementioned formula, a hand-forearm ratio is calculated at decision block 340 and upon calculating the hand-forearm ratio, a determination is made as to whether the calculated hand-forearm ratio calculated is greater than a pre-determined threshold, T. If indeed it is greater the process may continue proceeding to decision block 355. If the hand forearm ratio in block 340 is less than T then we proceed to temporal filtering block 365 directly. In one embodiment, at block 355, if iterative processing is on, block 360 applies the derived intermediate cut and the process of searching for a valid intermediate cut is repeated starting at block 325. On the other hand, if at block 355 iterative mode is off, we proceed to block 365 directly. At the end of iterative processing, i.e., when the hand-forearm ratio falls below T a temporal filter which considers previous observations to refine the detected final cut is applied using filtering logic 225 at block 365. Finally at block 370 if a valid cut is detected, the final cut is performed and final object obtained. The final binary image and/or the cut position and location (metadata) is outputted at block 375 which may then be displayed via a display device or used by a gesture classifier process as facilitated by gesture classifier 226 of FIG. 2A to detect or track the performed gesture.

Figure 4:
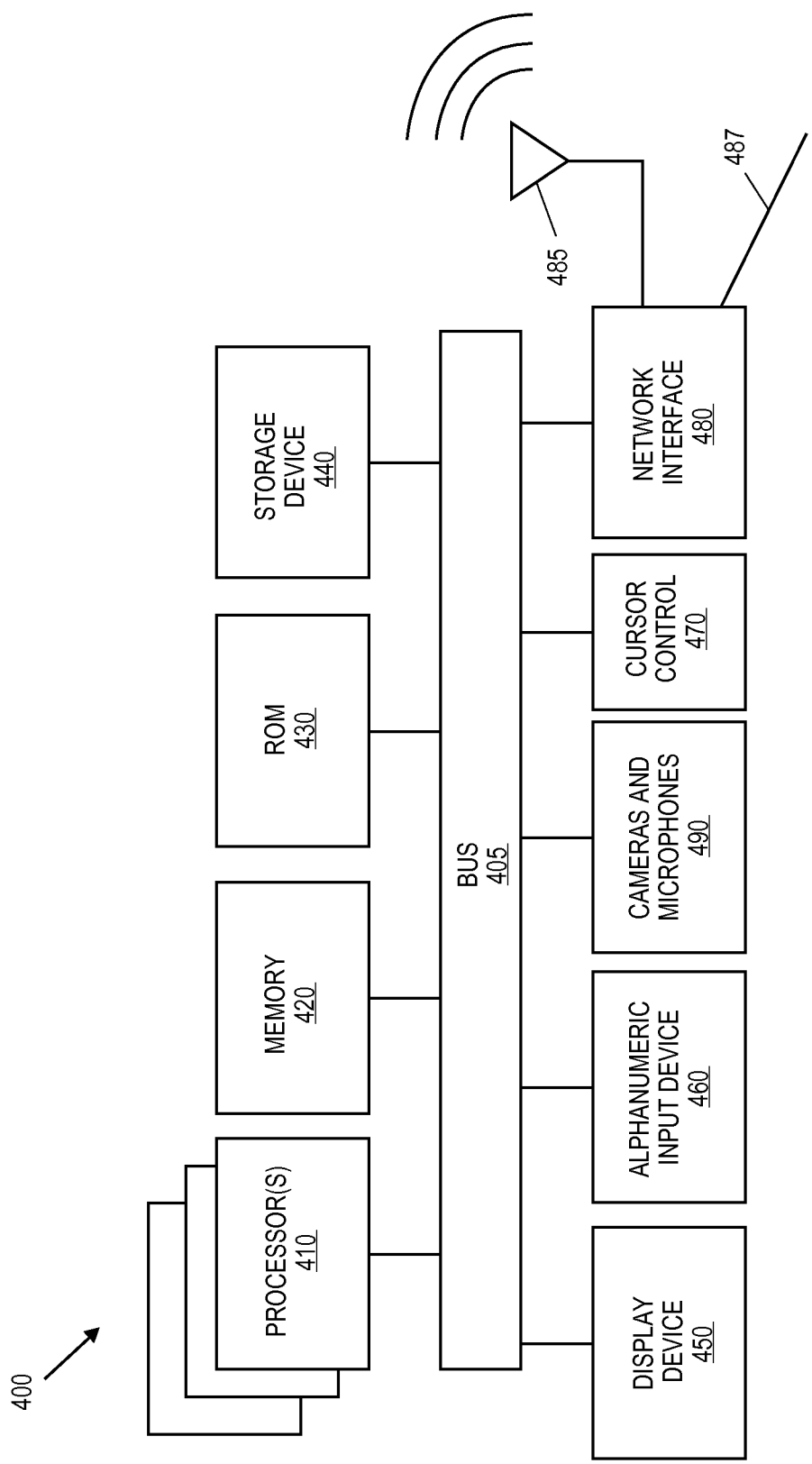
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 400 may be the same as or similar to or include computing devices 100 described in reference to FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, it may include multiple processors and/or co-processors, such as one or more of central processors, image signal processors, graphics processors, and vision processor, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate intelligent detection of body segmentation for enhanced gesture recognition on computing devices, comprising: reception/detection logic to receive an image; component extraction engine to divide the image into components representing regions of the image, and determine orientation and a centroid relating to each component; hypothesis cuts logic of ideal cut processing engine to facilitate generation of hypothesis cuts within hysteresis points, and calculate a first ratio based on an average width of the hypothesis cuts and a length of a first axis of a component, wherein the ideal cut processing engine further includes intermediate cut processing logic to segment the component at one of the hypothesis cuts to determine an intermediate cut of the component, if the first ratio is greater than a predetermined threshold; and iteration logic of the ideal cut processing engine to iteratively segment the component to determine a final cut.

Example 2 includes the subject matter of Example 1, wherein the final cut represents a desired portion of the component.

Example 3 includes the subject matter of Example 1, further comprising temporal parameter filtering logic to finalize, via temporal filtering, valid final cuts of the component.

Example 4 includes the subject matter of Example 1, further comprising: boundary smoothing logic to trace the component and smooth out one or more irregularities associated with a boundary of the component; and orientation region calculation logic to associate an orientation region to the component.

Example 5 includes the subject matter of Example 1, wherein the ideal cut processing engine further comprises extreme points logic to determine and assign extreme points to the first axis and a second axis of the component.

Example 6 includes the subject matter of Example 5, wherein the extreme points represent end-points of the first and second axes of the component, wherein the first axis includes the major axis, and wherein the second axis includes a minor axis.

Example 7 includes the subject matter of Example 1, wherein the ideal cut processing engine further comprises hysteresis points adaptive calculation logic to calculate and assign hysteresis points along the first axis of the component and within a proximity of the centroid, wherein the calculation is further based on a second ratio derived from lengths of the first and second axes of the component.

Some embodiments pertain to Example 8 that includes a method for facilitating intelligent detection of body segmentation for enhanced gesture recognition on computing devices, comprising: receiving an image; dividing the image into components representing regions of the image; determining orientation and a centroid relating to each component; facilitating generation of hypothesis cuts within hysteresis points; calculating a first ratio based on an average width of the hypothesis cuts and a length of a first axis of a component; segmenting the component at one of the hypothesis cuts to determine an intermediate cut of the component, if the first ratio is greater than a predetermined threshold; and iteratively segmenting the component to determine a final cut.

Example 9 includes the subject matter of Example 8, wherein the final cut represents a desired portion of the component.

Example 10 includes the subject matter of Example 8, further comprising finalizing, via temporal filtering, valid final cuts of the component.

Example 11 includes the subject matter of Example 8, further comprising: tracing the component and smooth out one or more irregularities associated with a boundary of the component; and associating an orientation region to the component.

Example 12 includes the subject matter of Example 8, further comprising determining and assigning extreme points to the first axis and a second axis of the component.

Example 13 includes the subject matter of Example 12, wherein the extreme points represent end-points of the first and second axes of the component, wherein the first axis includes the major axis, and wherein the second axis includes a minor axis.

Example 14 includes the subject matter of Example 8, further comprising calculating and assigning hysteresis points along the first axis of the component and within a proximity of the centroid, wherein the calculation is further based on a second ratio derived from lengths of the first and second axes of the component.

Example 15 includes at least one machine-readable medium comprising a plurality of instructions, when executed on a computing device, to implement or perform a method or realize an apparatus as claimed in any preceding claims.

Example 16 includes at least one non-transitory or tangible machine-readable medium comprising a plurality of instructions, when executed on a computing device, to implement or perform a method or realize an apparatus as claimed in any preceding claims.

Example 17 includes a system comprising a mechanism to implement or perform a method or realize an apparatus as claimed in any preceding claims.

Example 18 includes an apparatus comprising means to perform a method as claimed in any preceding claims.

Example 19 includes a computing device arranged to implement or perform a method or realize an apparatus as claimed in any preceding claims.

Example 20 includes a communications device arranged to implement or perform a method or realize an apparatus as claimed in any preceding claims.

Some embodiments pertain to Example 21 includes a system comprising a storage device having instructions, and a processor to execute the instructions to facilitate a mechanism to perform one or more operations comprising: receiving an image; dividing the image into components representing regions of the image; determining orientation and a centroid relating to each component; facilitating generation of hypothesis cuts within hysteresis points; calculating a first ratio based on an average width of the hypothesis cuts and a length of a first axis of a component; segmenting the component at one of the hypothesis cuts to determine an intermediate cut of the component, if the first ratio is greater than a predetermined threshold; and iteratively segmenting the component to determine a final cut.

Example 22 includes the subject matter of Example 21, wherein the final cut represents a desired portion of the component.

Example 23 includes the subject matter of Example 21, wherein the one or more operations comprise finalizing, via temporal filtering, valid final cuts of the component.

Example 24 includes the subject matter of Example 21, wherein the one or more operations comprise: tracing the component and smoothing out one or more irregularities associated with a boundary of the component; and associating an orientation region to the component.

Example 25 includes the subject matter of Example 21, wherein the one or more operations comprise determining and assigning extreme points to the first axis and a second axis of the component.

Example 26 includes the subject matter of Example 25, wherein the extreme points represent end-points of the first and second axes of the component, wherein the first axis includes the major axis, and wherein the second axis includes a minor axis.

Example 27 includes the subject matter of Example 21, wherein the one or more operations comprise calculating and assigning hysteresis points along the first axis of the component and within a proximity of the centroid, wherein the calculation is further based on a second ratio derived from lengths of the first and second axes of the component.

Some embodiments pertain to Example 28 includes an apparatus comprising: means for receiving an image; means for dividing the image into components representing regions of the image; means for determining orientation and a centroid relating to each component; means for facilitating generation of hypothesis cuts within hysteresis points; means for calculating a first ratio based on an average width of the hypothesis cuts and a length of a first axis of a component; means for segmenting the component at one of the hypothesis cuts to determine an intermediate cut of the component, if the first ratio is greater than a predetermined threshold; and means for iteratively segmenting the component to determine a final cut.

Example 29 includes the subject matter of Example 28, wherein the final cut represents a desired portion of the component.

Example 30 includes the subject matter of Example 28, further comprising means for finalizing, via temporal filtering, valid final cuts of the component.

Example 31 includes the subject matter of Example 28, further comprising: means for tracing the component and smoothing out one or more irregularities associated with a boundary of the component; and means for associating an orientation region to the component.

Example 32 includes the subject matter of Example 28, further comprising means for determining and assigning extreme points to the first axis and a second axis of the component.

Example 33 includes the subject matter of Example 32, wherein the extreme points represent end-points of the first and second axes of the component, wherein the first axis includes the major axis, and wherein the second axis includes a minor axis.

Example 34 includes the subject matter of Example 28, further comprising means for calculating and assigning hysteresis points along the first axis of the component and within a proximity of the centroid, wherein the calculation is further based on a second ratio derived from lengths of the first and second axes of the component.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   reception/detection logic to receive an image;
   component extraction engine to divide the image into components representing regions of the image, and determine orientation and a centroid relating to each component;

hypothesis cuts logic of ideal cut processing engine to facilitate generation of hypothesis cuts within hysteresis points, and calculate a first ratio based on an average width of the hypothesis cuts and a length of a first axis of a component, wherein the ideal cut processing engine further includes intermediate cut processing logic to segment the component at one of the hypothesis cuts to determine an intermediate cut of the component, if the first ratio is greater than a predetermined threshold; and iteration logic of the ideal cut processing engine to iteratively segment the component to determine a final cut.

2. The apparatus of claim 1, wherein the final cut represents a desired portion of the component.

3. The apparatus of claim 1, further comprising temporal parameter filtering logic to finalize, via temporal filtering, valid final cuts of the component.

4. The apparatus of claim 1, further comprising:
boundary smoothing logic to trace the component and smooth out one or more irregularities associated with a boundary of the component; and
orientation region calculation logic to associate an orientation region to the component.

5. The apparatus of claim 1, wherein the ideal cut processing engine further comprises extreme points logic to determine and assign extreme points to the first axis and a second axis of the component.

6. The apparatus of claim 5, wherein the extreme points represent end-points of the first and second axes of the component, wherein the first axis includes the major axis, and wherein the second axis includes a minor axis.

7. The apparatus of claim 1, wherein the ideal cut processing engine further comprises hysteresis points adaptive calculation logic to calculate and assign hysteresis points along the first axis of the component and within a proximity of the centroid, wherein the calculation is further based on a second ratio derived from lengths of the first and second axes of the component.

8. A method comprising:
receiving an image;
dividing the image into components representing regions of the image;
determining orientation and a centroid relating to each component;
facilitating generation of hypothesis cuts within hysteresis points;
calculating a first ratio based on an average width of the hypothesis cuts and a length of a first axis of a component;
segmenting the component at one of the hypothesis cuts to determine an intermediate cut of the component, if the first ratio is greater than a predetermined threshold; and
iteratively segmenting the component to determine a final cut.

9. The method of claim 8, wherein the final cut represents a desired portion of the component.

10. The method of claim 8, further comprising finalizing, via temporal filtering, valid final cuts of the component.

11. The method of claim 8, further comprising:
tracing the component and smoothing out one or more irregularities associated with a boundary of the component; and
associating an orientation region to the component.

12. The method of claim 8, further comprising determining and assigning extreme points to the first axis and a second axis of the component.

13. The method of claim 12, wherein the extreme points represent end-points of the first and second axes of the component, wherein the first axis includes the major axis, and wherein the second axis includes a minor axis.

14. The method of claim 8, further comprising calculating and assigning hysteresis points along the first axis of the component and within a proximity of the centroid, wherein the calculation is further based on a second ratio derived from lengths of the first and second axes of the component.

15. At least one machine-readable medium comprising a plurality of instructions, executed on a computing device, to facilitate the computing device to perform one or more operations comprising:
receiving an image;
dividing the image into components representing regions of the image;
determining orientation and a centroid relating to each component;
facilitating generation of hypothesis cuts within hysteresis points;
calculating a first ratio based on an average width of the hypothesis cuts and a length of a first axis of a component;
segmenting the component at one of the hypothesis cuts to determine an intermediate cut of the component, if the first ratio is greater than a predetermined threshold; and
iteratively segmenting the component to determine a final cut.

16. The machine-readable medium of claim 15, wherein the final cut represents a desired portion of the component.

17. The machine-readable medium of claim 15, wherein the one or more operations further comprise finalizing, via temporal filtering, valid final cuts of the component.

18. The machine-readable medium of claim 15, wherein the one or more operations further comprise:
tracing the component and smooth out one or more irregularities associated with a boundary of the component; and
associating an orientation region to the component.

19. The machine-readable medium of claim 15, wherein the one or more operations further comprise determining and assigning extreme points to the first axis and a second axis of the component.

20. The machine-readable medium of claim 19, wherein the extreme points represent end-points of the first and second axes of the component, wherein the first axis includes the major axis, and wherein the second axis includes a minor axis.

21. The machine-readable medium of claim 15, wherein the one or more operations further comprise calculating and assigning hysteresis points along the first axis of the component and within a proximity of the centroid, wherein the calculation is further based on a second ratio derived from lengths of the first and second axes of the component.

* * * * *